United States Patent [19]
Azuma et al.

[11] Patent Number: 5,898,763
[45] Date of Patent: Apr. 27, 1999

[54] EQUIPMENT FOR FACSIMILE CALL SERVICE OF TELEPHONE EXCHANGE

[75] Inventors: Fusao Azuma, Kanagawa; Noriko Kawamura, Tokyo; Teruo Ohno; Makoto Hibara, both of Saitama, all of Japan

[73] Assignee: Kokusai Denshin Denwa Kabushiki Kaisha, Tokyo, Japan

[21] Appl. No.: 08/887,665

[22] Filed: Jul. 3, 1997

Related U.S. Application Data

[63] Continuation of application No. 08/452,029, May 26, 1995, abandoned.

[30] Foreign Application Priority Data

Jul. 1, 1994 [JP] Japan .................................. 6-173187
Jul. 1, 1994 [JP] Japan .................................. 6-173188

[51] Int. Cl.⁶ ............................................... H04M 11/00
[52] U.S. Cl. ................................. 379/100.04; 379/114
[58] Field of Search ......................... 379/100.04, 100.01, 379/93.14, 111, 114, 115, 120, 34; 358/401, 405, 406, 468

[56] References Cited

U.S. PATENT DOCUMENTS

| 5,237,427 | 8/1993 | Mizutori | 358/406 |
| 5,265,153 | 11/1993 | Ozawa | 379/100 |
| 5,381,242 | 1/1995 | Fujii | 379/100 |
| 5,490,199 | 2/1996 | Fuller et al. | 379/100 |

FOREIGN PATENT DOCUMENTS

| 0 400 771 | 12/1990 | European Pat. Off. . |
| 0 429 048 | 5/1991 | European Pat. Off. . |
| 2-243052 | 9/1990 | Japan . |
| 3-40655 | 2/1991 | Japan . |

Primary Examiner—Stella Woo
Attorney, Agent, or Firm—Westman, Champlin & Kelly, P.A.

[57] ABSTRACT

An equipment for facsimile call service of a telephone exchange which can apply an unique charging system to a facsimile call by distinguishing the facsimile call from ordinary speech calls, notify a caller of cause when occurring a failure in transmitting the facsimile call, and advise the caller on the way to eliminate the cause.

6 Claims, 6 Drawing Sheets

EQUIPMENT FOR FACSIMILE CALL SERVICE OF TELEPHONE EXCHANGE

This is a continuation of application Ser. No. 08/452,029, filed May 26, 1995, now abandoned.

BACKGROUND OF THE INVENTION

1. Field of the Invention

This invention generally relates to an equipment for facsimile call service of a telephone exchange and, more particularly, to an equipment for facsimile call service of a telephone exchange which can apply an unique charging system to a facsimile call by distinguishing the facsimile call from a speech call, notify a caller of cause when occurring a failure in transmitting the facsimile call, and advice the caller on the way to eliminate the cause.

2. Description of the Prior Art

Up to this time, an overseas facsimile communications network has been made by connecting subscriber facsimiles to respective subscriber lines. The demand for such a facsimile communication rapidly increases as overseas business expands. The facsimile communication generally has the advantages of finishing caller's work even if the callee is not there and making transmission time shorter than speech communication.

All kinds of communication, such as facsimile, data communication or the like, passing through telephone exchanges is processed in the same manner as the speech communication since these communications can not be distinguished from the speech communication at the telephone exchanges. Also, the facsimile communication is made using local telephone lines, so that an ordinary telephone call charging system is applied thereto. For this reason, any caller will be charged for the call even if the caller has not completed his or her work due to a failure of the facsimile transmission, and this has caused a problem that an appropriate communication system has not yet realized by making a good use of properties unique to the facsimile communication but not the speech communication.

Further, when failing in the transmission, no subscriber can know information other than the result of "transmission error" displayed on his or her facsimile since the transmission is made between the facsimiles. Therefore, in order to transmit document information to the receiving side, the sending side has no other way than to repeatedly transmit the document till the transmission is achieved successfully without knowing the reason for the transmission error. Particularly, when the facsimile transmission through the international telephone network was not completed by an unknown reason, the subscriber of the sending side must attempt the transmission many times without success since he or she can never know the reason.

SUMMARY OF THE INVENTION

In order to eliminate the above conventional problems, an object of the present invention is to provide an equipment for facsimile call service of a telephone exchange which can apply an unique charging system to facsimile communication conventionally treated as speech communication by distinguishing the facsimile communication from the speech communication.

Another object of the present invention is to provide an equipment for facsimile call service of a telephone exchange which, when one or more pages of the document were not sent by facsimile transmission, detects communication parts of the failed pages and avoids charging for the parts.

Still another object of the present invention is to provide an equipment for facsimile call service of a telephone exchange which eliminates the above conventional problems in the art and advises a subscriber properly how to do when occurring a failure in facsimile communication.

In order to accomplish the above objects, the present invention provides an equipment for facsimile call service of a telephone exchange capable of identifying facsimile calls out of all calls on a speech path which includes a data base for storing a facsimile charging list and a means for calculating the sum of charges from the facsimile charging list based upon the facsimile transmission time.

According to the present invention, the sum of charges can be calculated by applying the facsimile charging list to a facsimile call identified at the telephone exchange, resulting in a flexible charging system in comparison with the conventional charging system.

The present invention is also featured by including a detection means for detecting cause of a failure in transmitting the facsimile call and a display means for displaying at least the caller's contact number and the cause of the transmission failure.

According to the present invention, the telephone exchange determines whether the received calling tone is for a facsimile call, so that, if for the facsimile call, the telephone exchange monitors the communication conditions. When the transmission has finished unsuccessfully, then the telephone exchange detects the cause of the transmission failure, and it displays at least the caller's contact number of the facsimile call and the reason for the transmission failure on a display device. As a result, the caller of the facsimile call can be notified of the transmission failure from an operator of the telephone exchange as required, thus establishing an appropriate consulting system.

DETAILED DESCRIPTION OF THE PREFERRED EMBODIMENTS

Figure 1:
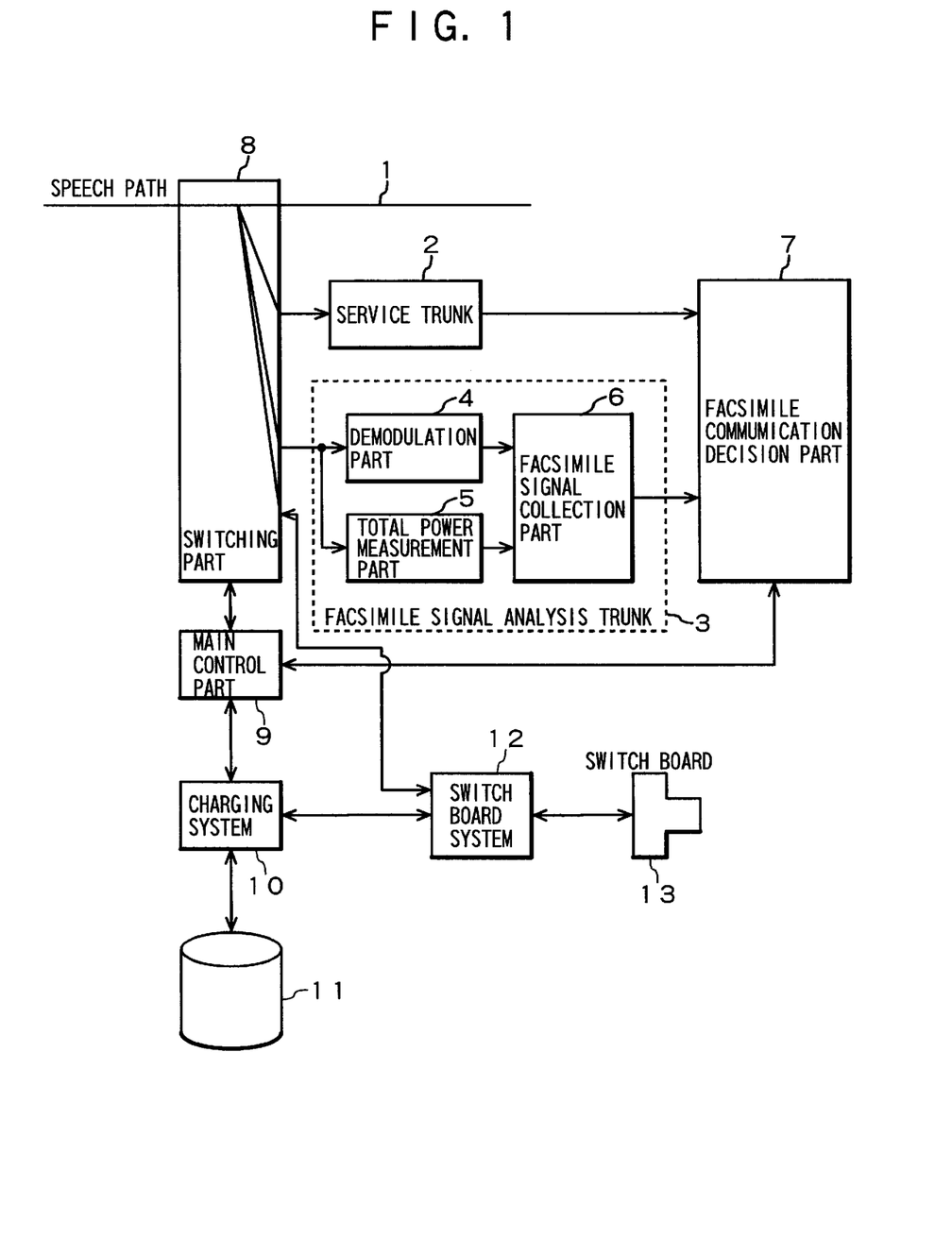
FIG. 1 is a schematic block diagram showing a hardware structure of an exchange system to which the present invention is applied.

Referring now to the drawings, the present invention will be described in detail hereinbelow. FIG. 1 is a schematic block diagram showing a hardware structure of an exchange system provided by a common carrier to which the present invention is applied.

In the figure, a speech path 1 is used for a voice grade circuit and a service trunk 2 is used to distinguish, for example, between an inband signaling tone for telephone exchange, such as a speech tone or a busy tone, and a facsimile signaling tone out of all inband signaling tones on the speech path 1. The service trunk 2 is well-known as disclosed in Japanese Patent Publication Number 62-204652 and the detailed description thereof will be omitted.

A facsimile signal analysis trunk 3 is used for collection of facsimile signals, signal error monitor, and total power measurement. In the facsimile signal analysis trunk 3, a demodulation part 4 demodulates coded and modulated facsimile signals transmitted through the speech path 1; a total power measurement part 5 measures the total power of the inband signaling tones transmitted through the speech path 1 continuously for a predetermined time to obtain a maximum value, a mean value and a minimum value of the power amount; and a facsimile signal collection part 6 collects the facsimile signals demodulated by the demodulation part 4 to collect the results of error check on each facsimile signal, and further, it collects the results of the power amount measurement from the total power measurement part 5.

Then, when the service trunk 2 has identified an inband signaling tone on the speech path 1 as a data tone like a facsimile tone, a facsimile communication decision part 7 analyzes the results collected in the facsimile signal collection part 6 to check it against a known facsimile transmission procedure, and further, it analyzes the conditions of the facsimile communication, such as decision of noise, signaling level and the like. The facsimile communication decision part 7 also measures the communication time.

A speech path switching part 8 provides for switching a plurality of circuits at the same time and a main control part 9 provides for total control of the telephone exchange system. A charging system 10 charges each caller for a call, according to the present invention, depending upon whether it is the telephone call or the facsimile call. A data base 11 stores data, such as contractor numbers, call types, a charging list for telephone call, a charging list for facsimile call, communication histories for the respective contractors, and the like. A switch board system 12 then connects a switch board 13 with the switching part 8 and the charging system 10, and the switch board 13 connects subscribers through an operator's response. The switch board 13 includes a display device for displaying information received by the switch board system 12.

Figure 2:
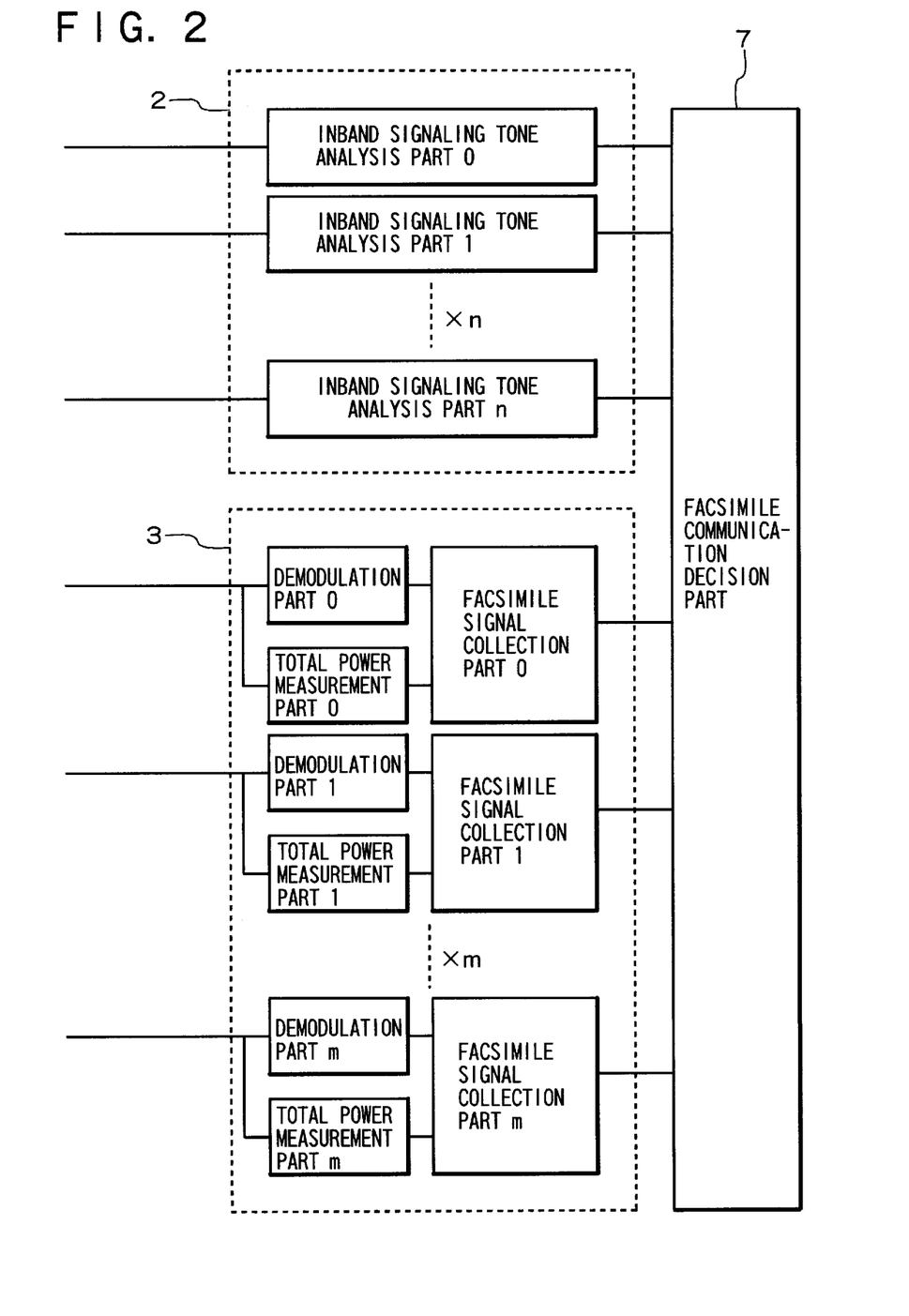
FIG. 2 is a partial block diagram showing details of the exchange system of FIG. 1.

FIG. 2 shows a concrete structural example of the service trunk 2 and the facsimile signal analysis trunk 3 of FIG. 1. As shown in the figure, the service trunk 2 is constituted of n+1 inband signaling tone analysis parts (where, n is a positive integer); and the facsimile signal analysis trunk 3 is constituted of m+1 sets of a demodulation part 4 (where, m is a positive integer), a total power measurement part 5 and a facsimile signal collection part 6.

Figure 3:
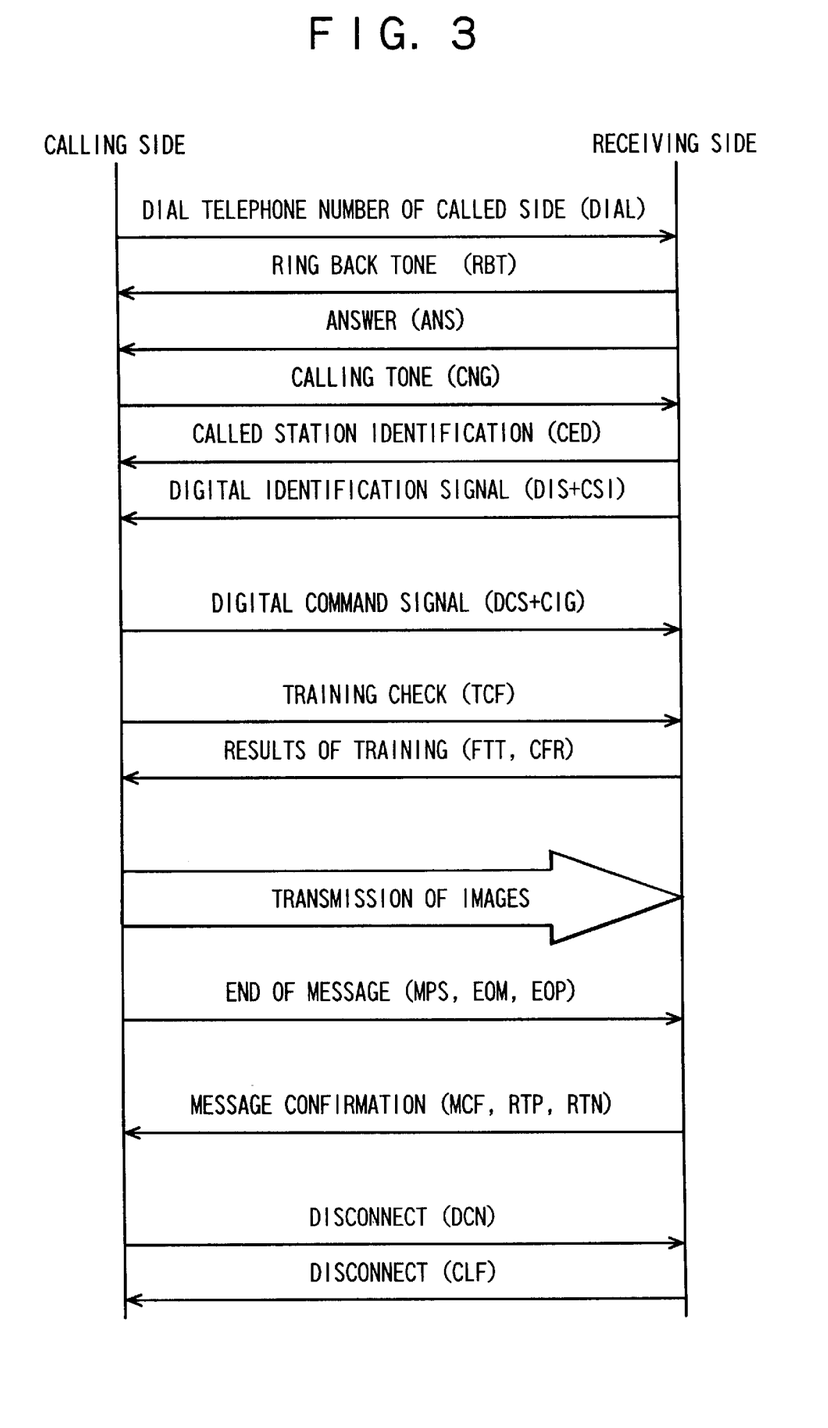
FIG. 3 is a diagram showing T30 standard communication protocol for facsimile communication.

Next, referring to FIG. 3, T30 standard communication protocol for facsimile communication will be described in brief.

When a sending side has dialed a telephone number of a receiving side and the receiving side answers thereto, then one facsimile of the calling side outputs a calling tone (CNG) of 1100 Hz for indicating that the facsimile is a non-vocal terminal. On the other hand, the other facsimile of the receiving side outputs a called station identification tone (CED) of 2100 Hz to notify that the facsimile of the receiving side has answered to the call. The facsimile of the receiving side then outputs digital identification signals (DIS and CSI signals) to inform the sending side on functional details and the identification number of the receiving side. After receiving the digital identification signals, the sending side outputs digital command signals (DCS and CIG signals) to inform the receiving side on transmission conditions and the identification number of the sending side.

The DIS and DCS signals include country name of the machine maker, maker name, signaling speed (14400 bps, 12000 bps, 9600 bps, or 7200 bps), size of recording paper (A4, B5, B4 or non-limitation), error correction function (ECM) Yes/No, mode setting (normal/fine), image compression mode Yes/No, type (MH, MR) and the like. On the other hand, the CSI and CIG signals include a machine identification number (telephone number, company name, section name, etc.).

After end of the above communication, the facsimile of the calling side sends a test signal for a training check (TCF). The facsimile of the receiving side then returns an accepting state of this training signal, that is, when failing in the training, it returns a FTT signal, and when finishing the training successfully, it returns a CFR signal for confirming a state of receive preparation. At the time of receiving the CFR signal, the facsimile of the calling side then starts sending images. In this operation to send images, an image signal for one page is first sent to the receiving side, then an end of message signal will be sent. For the end of message signal, there are used an MPS signal for transmitting next page without any change of the transmission conditions, an EOM signal for transmitting next page by changing the transmission conditions, and an EOP signal for indicating that the last page has been transmitted.

On the other hand, the receiving side outputs a message confirmation signal after receiving the end of message signal. The message confirmation signal is used as information on the received image quality, including an MCF signal for indicating a preferable quality, a RTP signal for indicating that the quality would be a bit lower than the preferable case, and RTN signal for indicating an inferior quality. When the calling side receives the MCF signal after outputting the above MPS signal, the image signal for next page is transmitted. If the RTN signal is received, then the image signal for the same page is transmitted instead.

In the above operation, when outputting the EOP signal as the end of message signal to receive the MCF signal from the receiving side, then the calling side outputs a disconnect signal (DCN) to inform the receiving side that the facsimile transmission has been completed.

As discussed above regarding the T30 standard communication protocol, the demodulation part 4 of the facsimile signal analysis trunk 3 demodulates the respective signals according to the above communication protocol to inform thereof to the facsimile signal collection part 6. The total power measurement part 5 then measures the total power of the inband signaling tones continuously for a predetermined time to obtain a maximum value, a mean value and a minimum value of the power amount. The facsimile communication decision part 7 checks the signals collected in the facsimile signal collection part 6 against the respective signals according to the prescribed communication protocol to monitor the facsimile communication in progress. The facsimile communication decision part 7 also checks the results of outputs from the total power measurement part 5 to decide whether the facsimile communication has finished successfully or not, diagnosing cause of the communication failure when the communication has finished unsuccessfully. In addition, the facsimile communication decision part 7 measures the communication time. These results of checks and measurement are sent to the charging system 10 through the main control part 9.

Next, an operation of this embodiment will be described. The main control part 9 in the telephone exchange system acquires an outgoing trunk by a known exchange connection process after detecting a call, then, it sets a speech path into the switching part 8. At the same time, the main control part 9 commands the facsimile communication decision part 7 to start monitoring the speech path 1. The main control part 9 also identifies the caller referring to the calling telephone number.

The facsimile communication decision part 7 that has received the command selectively acquires vacant one out of a plurality of inband signaling tone analysis parts (0 to n) and facsimile signal collection parts (0 to m), then, it commands the selected one to start monitoring the speech path 1. The facsimile communication decision part 7 also orders the main control part 9 so as to command the selected inband signaling tone analysis part, and a demodulation part and a total power measurement part, both being under control of the corresponding facsimile signal collection part, to set a path in the switching part 8 for monitoring the telephone path of the call. After receiving the command to monitor the speech path, the facsimile signal collection part 6 makes a monitoring timer run so that the demodulation part and the total power measurement part monitor the telephone path for a time prescribed by the monitoring timer.

In the state of monitoring the speech path, if there exists a facsimile signal coded and modulated into an inband signal even on one way of the speech path 1, then the demodulation part 4 automatically detects the signal to inform thereof to the facsimile signal collection part 6. The facsimile signal collection part 6 reads out the demodulated facsimile signals in order of detection to check whether each of them is a signal defined in a known manner. If not, the corresponding signal is stored by giving it relative time to the facsimile signal latest received. The demodulation part 4 also performs a frame check sequence for facsimile signal, and the facsimile signal collection part 6 reads out and stores the signal even when a data frame error is detected by the above check.

The total power measurement part 5 having a threshold, if it starts with an unvoiced sound at the time of running the measurement of the power amount, starts measuring the power amount from a point of time when changing to a voiced sound. Then, when changing from the voiced sound to the unvoiced sound in measurement continuous time, the total power measurement part 5 immediately interrupts the measurement and automatically informs the facsimile signal collection part 6 of the power amount measured just before interruption. On the contrary, the total power measurement part 5, if it starts with the voiced sound at the time of running the measurement of the power amount, starts measuring the power amount from a point of time when changing to the unvoiced sound. Then, when changing from the unvoiced sound to the voiced sound in the measurement continuous time, the total power measurement part 5 immediately interrupts the measurement and automatically informs the facsimile signal collection part 6 of the power amount measured just before interruption.

If the inband signaling tone on the speech path 1 is identified as a data tone like a facsimile signaling tone by the service trunk 2, then the facsimile communication decision part 7 analyzes the results collected by the facsimile signal collection part 6 to check it against a known facsimile transmission procedure, retrieving a voluntary facsimile signal set in advance. That is, the facsimile communication decision part 7 analyzes the results of the collection, checks it against the known facsimile transmission procedure, retrieves the voluntary facsimile signal set in advance, and informs the main control part 9 of the following information (1) to (3).

(1) Facsimile information of the sending and receiving sides (included in the digital identification information and the digital command information).
  (a) Country name of the machine maker (Japan, U.S.A., UK, etc.)
  (b) Maker name
  (c) Machine identification number (telephone number, company name, etc.)
(2) Communication conditions (included in the digital identification information and the digital command information).
  (a) Initial signaling speed
  (b) Size of recording paper
  (c) Error correction function (ECM) Yes/No
  (d) Mode setting (normal/fine)
  (e) Image compression mode Yes/No and type (MH, MR, MMR, etc.)
(3) Results of transmission
  (a) Number of transmitted papers, transmission speed and time required for image transmission (time required for transmission per page) in the case the transmission has finished successfully.
  (b) In case of transmission failure
    (b-1) Failed pages, time required for image transmission
    (b-2) Turning point of transmission failure (before training, during training operation, during image transmission, after delivery of the image, on and after the second sheet, etc.)
    (b-3) Cause of transmission failure (training failure, inferior image reception, circuit cutting from called side for bad image reception, etc.)
    (b-4) Transmission speed When receiving the above information from the facsimile communication decision part 7, then the main control part 9 transfers these information to the charging system 10. The charging system 10 receives necessary information out of these information to register it in the data base 11 for each contractor. When the transmission has finished unsuccessfully, the main control part 9 informs the switch board system 12 on the cause of the transmission failure mentioned at (b) of the above information (3) and other information required for consulting.

As discussed above, the following information is sent to the main control part 9: information concerning the transmission success/unsuccess as the result of transmission; information on the number of transmitted papers, transmission speed and time required for the image transmission per paper in the case the transmission has finished successfully; information on the failed pages, the time required for the image transmission per paper, the turning point of the transmission failure (before training, during training operation, during image transmission, after image transmission, on and after the second sheet. etc.), the cause of the transmission failure (training failure, inferior image reception, circuit cutting from called side for bad image reception, etc.), and transmission speed in case of transmission failure.

Figure 4:
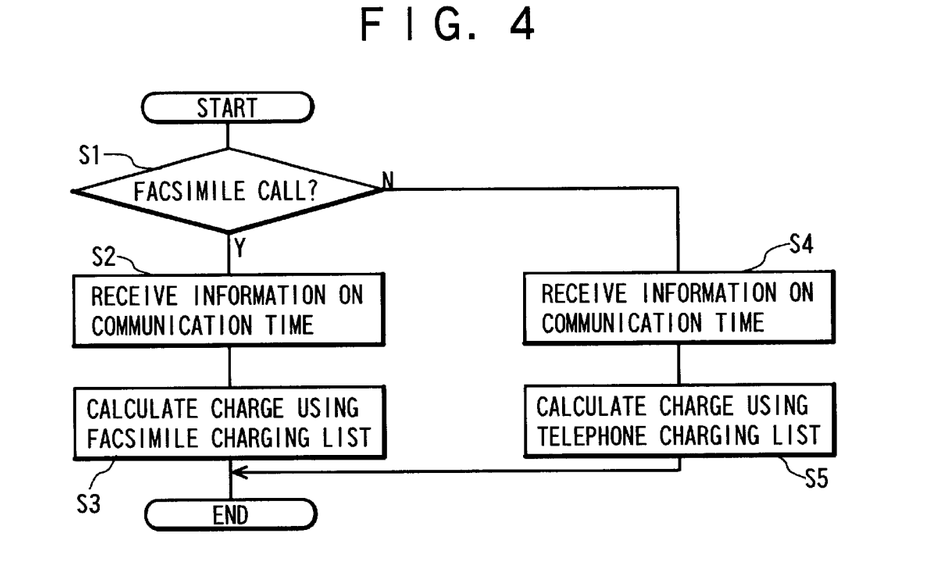
FIG. 4 is a flow chart showing an operation of a first embodiment according to the present invention.

The charging system 10 receives information on a type of call newly received from the main control part 9. As shown at step S1 of FIG. 4, this new call is determined as to whether it is a facsimile call or not. If the determination is positive, i.e., if it is determined to be the facsimile call, then the process goes to step S2 to receive information on the time required for the facsimile communication from the main control part 9. At step S3, the charging system 10 calculates the calling charge using the facsimile charging list stored in the data base 11. On the contrary, if the call is a telephone call, the process goes to step S4 to receive information on the time required for the telephone communication. Then, at step S5, the charging system 10 calculates the calling charge using the telephone charging list.

As described above, according to the embodiment, the common carrier can determine, at the exchange system, whether a call newly received is a facsimile call or not, so that, if it is the facsimile call, the charge can be calculated using an unique charging system for facsimile call, thereby effectively creating and applying a flexible charging system. For example, since most facsimile communication is made by transmitting only one page of document, the charge according to the charging system of the present invention can be made cheaper than the conventional charging system.

Figure 5:
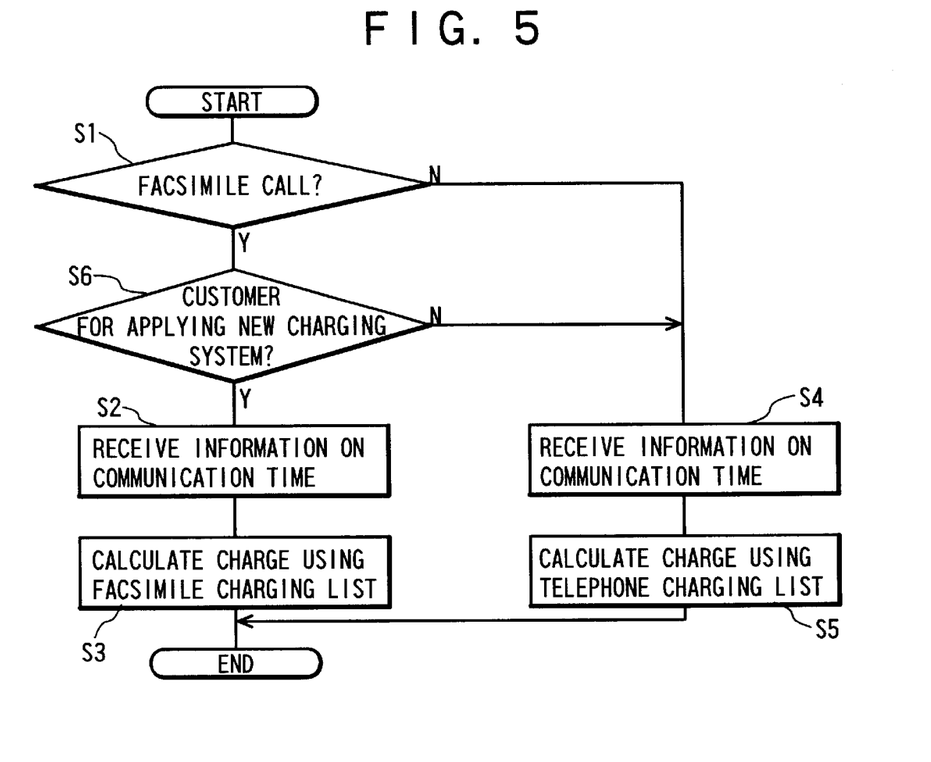
FIG. 5 is a flow chart showing an operation of a second embodiment according to the present invention.

Next, referring to FIG. 5, a second embodiment of the present invention will be described. In FIG. 5, the processes of steps S1 to S5 are the same as those of FIG. 4 and the second embodiment is featured in that step S6 is provided after step S1.

A customer's list to which a new charging list, i.e., a facsimile charging list is applied is registered in the data base 11 together with respective telephone numbers. As a result, when a customer has made a call using the customer's facsimile, the telephone number of the caller can be detected from the transmitted telephone number or the CIG signal, so that the charging system 10 checks the detected telephone number against the corresponding telephone number on the customer's list stored in the data base 11, thus performing determination of step S6.

According to the embodiment, only customers, who are previously registered as customers to which a new charging list is applied, can be charged using the facsimile charging list.

Figure 6:
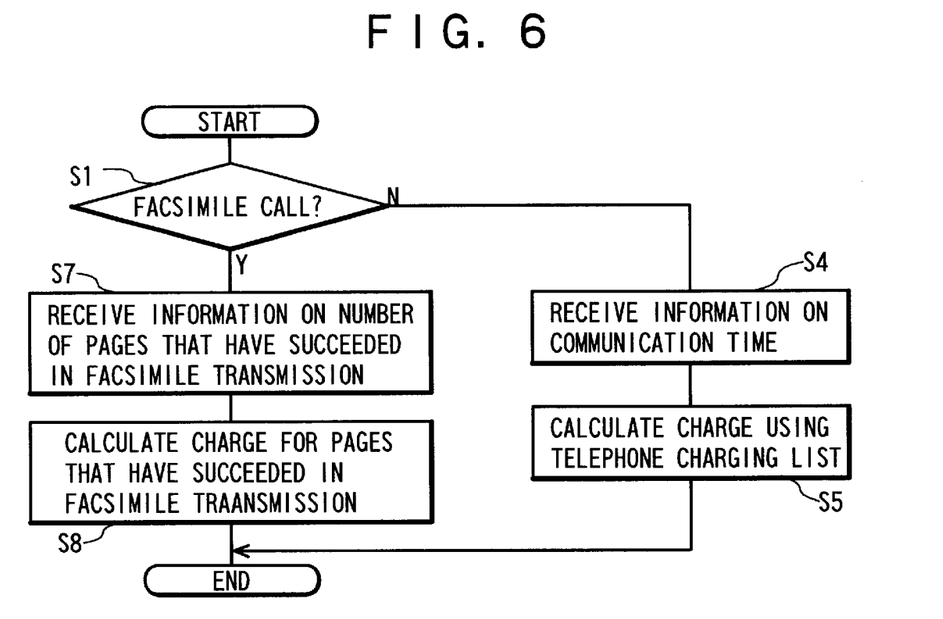
FIG. 6 is a flow chart showing an operation of a third embodiment according to the present invention.

Next, referring to FIG. 6, a third embodiment of the present invention will be described. In FIG. 6, steps S1, S4 and S5 are the same as the corresponding steps of FIGS. 4 and 5 and the descriptions thereof will be omitted. At step S7, the charging system 10 receives, from the main control part 9, information on the number of pages that the facsimile transmission has finished successfully. Then, at step S8, the charge is calculated per page from the pages that the facsimile transmission has finished successfully. In other words, the charge is not calculated from the other pages that have failed in the facsimile transmission. The determination as to whether the facsimile transmission has finished successfully or not is considered to be successful at the time of detecting the MCF or RTP signal, but to be unsuccessful at the time of detecting the RTN signal.

According to the embodiment, the charge is calculated per page from the pages that the facsimile transmission has finished successfully, but not the other pages that have failed in the facsimile transmission, thereby carrying out a preferable charging system for every customer. In other words, this has an advantage of calculating the calling charge per page. In the embodiment, the new charging list may be applied to only the customers previously registered in the same manner as that of the second embodiment.

To give a modified example of this embodiment, a transmission unit price per page can be set depending upon the paper size of the transmitted document. In case of undefined paper size, the charge can be calculated by using the conventional charging list for telephone call.

Figure 7:
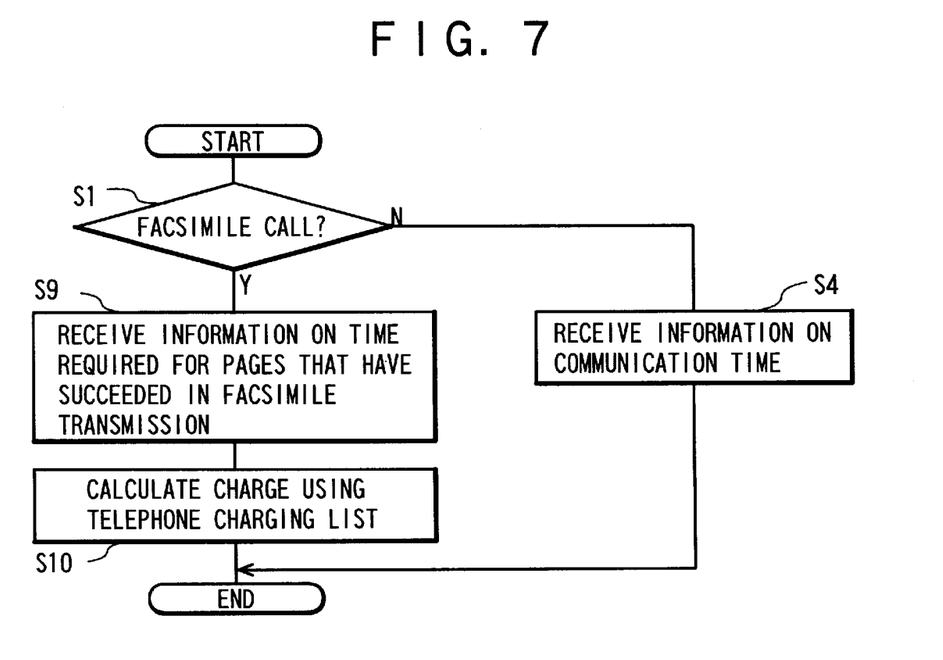
FIG. 7 is a flow chart showing an operation of a fourth embodiment according to the present invention.

Next, referring to FIG. 7, a fourth embodiment of the present invention will be described. In FIG. 7, steps S1 and S4 are the same as the corresponding steps of FIGS. 4 to 6 and the descriptions thereof will be omitted. At step S9, the charging system 10 receives, from the main control part 9, information on the time required for the transmitted pages that has finished successfully. For example, the call that has failed before end of the facsimile transmission of the first paper is determined that the communication time would be 0 min., while the call that has failed in the transmission on and after the second paper is determined that its charging time would be calculated from the time required for the successful pages. Then, at step S10, the charge is calculated based upon the above charged time by using the charging list for telephone call.

According to the embodiment, the charge is calculated based upon the transmission time required for pages that have succeeded in the facsimile transmission by using the charging list for telephone call, so that the charge can not be calculated from the other pages that have failed in the transmission, i.e., the discount can be given automatically for the call that has failed in the facsimile transmission, thereby carrying out a preferable charging system for every customer as well as the third embodiment. In addition, this embodiment may apply the new charging list only to the customers previously registered in the same manner as the second embodiment.

Figure 8:
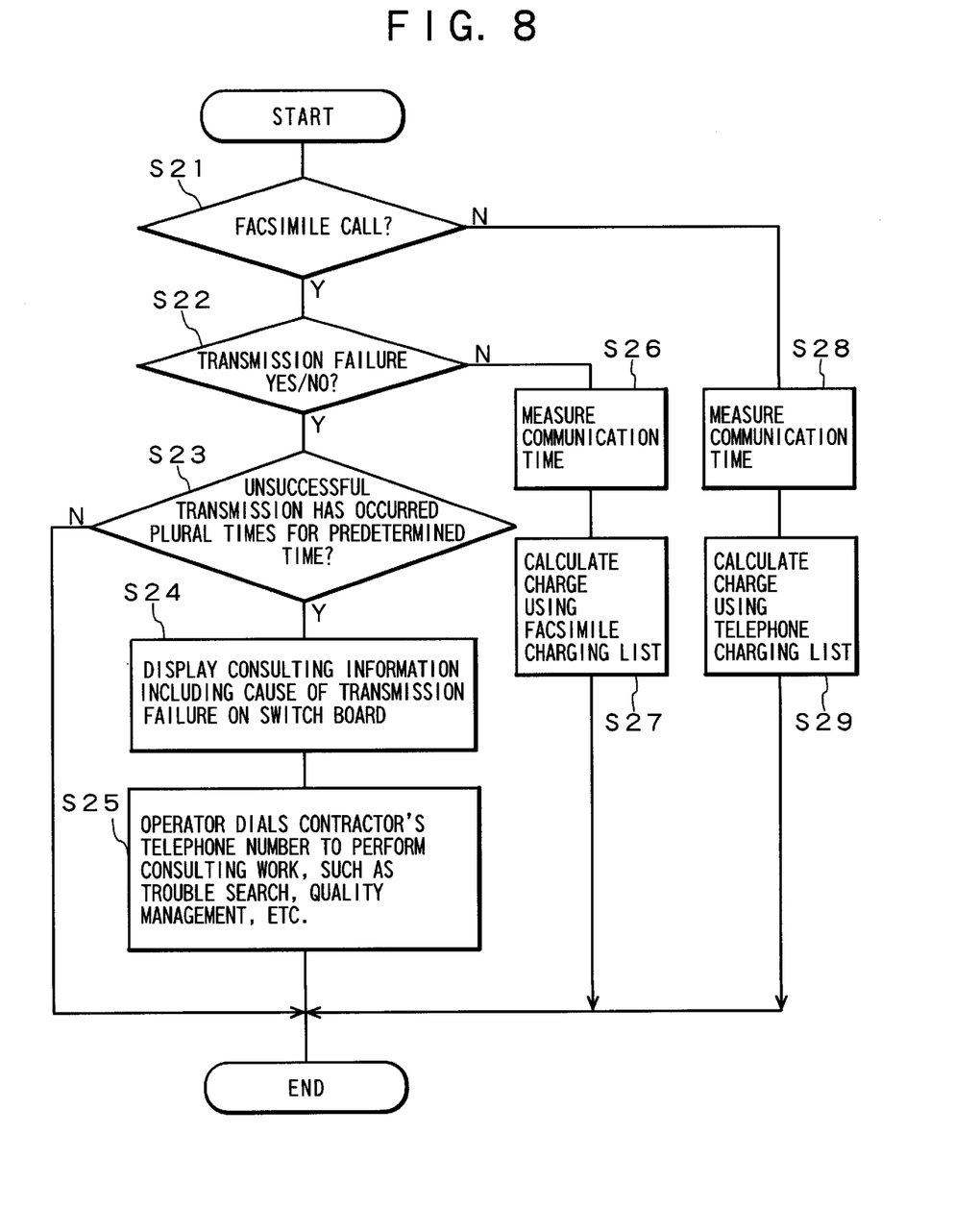
FIG. 8 is a flow chart showing an operation of a fifth embodiment according to the present invention.

Next, referring to a flow chart of FIG. 8, a fifth embodiment of the present invention will be described. At step S21, the charging system 10 determines whether the present call is a facsimile call or not based upon information received from the main control part 9. If the determination is positive, the process goes to step S22 to determine whether the facsimile call is inferior transmission. If the determination is positive, then the process goes to step S23 to determine whether the call has failed in the transmission n times (where, n is a positive integer, e.g., three) within a predetermined time. If the determination is negative, the process ends as it is. On the contrary, if positive, the process goes to step S24 at which the charging system 10 sends consulting information to the switch board system 12, including the information on the cause of the transmission failure. The switch board system 12 receives the consulting information and then displays it on the switch board 13. Then, at step S25, an operator calls the contractor's telephone number to consult the contractor on trouble searches, quality management, etc. The reason not to set n=1 is because consulting for each transmission failure can cause the subscriber trouble.

If the determination of step S21 is negative, the process goes to step S28 to measure the communication time. Next, at step S29, the charge is calculated by applying the charging list for telephone communication to the measured communication time. On the other hand, if the determination of step S22 is negative, i.e., if the transmission has finished successfully, the process goes to step S26 to measure the communication time in the same manner as step S8. Then, at step S27, the charge is calculated by applying the facsimile charging list to this measured communication time. For the facsimile charging list, there is used an unique charging system different from the charging system for telephone call. Actually, most facsimile communication is made by transmitting only one page, so that the first page to be transmitted is made cheaper than the case of the charging list for telephone communication, thus giving the facsimile transmitter facilities. Also, the charge can be calculated from the pages that have succeeded in the transmission, but not from the other pages that have failed in the transmission.

As described above, according to the embodiment, the subscriber who has failed in transmission plural times within the predetermined time can be effectively advised on cause of the transmission failure and the way to eliminate the cause. Also, an employee of the common carrier can visit the subscriber to advise him or her effectively and properly.

As apparent from the above description, according to the present invention, the charge can be calculated by applying the charging list unique to the facsimile call on the speech path, thereby effectively establishing a flexible charging system. Also, since the charge is calculated from the pages that have succeeded in the facsimile transmission but not from the other pages that has failed in the facsimile transmission, a reasonable charging system can be applied to every user. In addition, the users to whom the charging system unique to the facsimile call is applied can be registered in advance, thereby easily providing the charging service.

Also, according to the present invention, the caller who has failed in the facsimile transmission can be informed on cause of the transmission failure and the way to eliminate the cause, thereby relieving the caller from anxiety. In addition, the cause of the transmission failure can be eliminated early and this makes it possible to succeed in the subsequent facsimile transmission, resulting in improvement of the communication service. Furthermore, when failing in the transmission plural times within the predetermined time, the common carrier can consult the caller, thereby carrying out the consulting system without bothering the caller. In other words, the operator of the common carrier can consult the caller preferably, thus improving the communication service.

What is claimed is:

1. An equipment for facsimile call service of a telephone exchange, comprising:
   a means for identifying a signaling tone on a speech path as a data tone, the speech path having a plurality of calls, then checking the signaling tone against a known facsimile transmission procedure, and identifying a facsimile call out of the calls on the speech path;
   a data base for storing a charging list unique to the facsimile call which differs from a telephone charging list; and
   a means for calculating a sum of charges from the facsimile charging list based upon time required for the corresponding facsimile communication.

2. An equipment according to claim 1, further comprising a means for searching whether each caller is previously registered so that on a registered caller can be charged by calculating a calling charge from the facsimile charging list.

3. An equipment for facsimile call service of a telephone exchange, comprising:
   a means for identifying a signaling tone on a speech path as a data tone, then checking the signaling tone against a known facsimile transmission procedure, and identifying a facsimile call out of all calls on the speech path;
   a data base for storing a charging list unique to the facsimile call for each page that has succeeded in facsimile transmission;
   means for counting a number of pages that have succeeded in facsimile transmissions; and
   a means for calculating a sum of charges from the facsimile charging list for each page that has succeeded in facsimile transmission based upon the number of pages that the facsimile transmission has finished successfully.

4. An equipment according to claim 3, further comprising a means for searching whether each caller is previously registered so that only a registered caller can be charged by calculating a calling charge from the facsimile charging list for each page that has succeed in facsimile transmission.

5. An equipment for facsimile call service of a telephone exchange, comprising:
   means for identifying a signaling tone on a speech path as a data tone, then checking the signaling tone against a known facsimile transmission procedure, and identifying a facsimile call out of all calls on the speech path as the result;
   a data base for storing a telephone charging list;
   a means for measuring time required for pages that have succeeded in facsimile transmission; and
   a means for calculating a sum of charges from the telephone charging list based upon the time required for pages that have succeeded in facsimile transmission.

6. An equipment according to claim 5, further comprising a means for searching whether each caller is previously registered so that only a registered caller can be charged by calculating a calling charge from the telephone charging list.

* * * * *

UNITED STATES PATENT AND TRADEMARK OFFICE
CERTIFICATE OF CORRECTION

PATENT NO. : 5,898,763
DATED      : April 27, 1999
INVENTOR(S): Fusao Azuma et al.

It is certified that error appears in the above-identified patent and that said Letters Patent is hereby corrected as shown below:

Colum 10, line 6, cancel "on" and insert
--only--.

Signed and Sealed this

Thirteenth Day of June, 2000

Attest:

Q. TODD DICKINSON

*Attesting Officer*    *Director of Patents and Trademarks*